United States Patent
Jiang et al.

(10) Patent No.: US 10,976,429 B1
(45) Date of Patent: Apr. 13, 2021

(54) SYSTEM AND METHOD FOR SYNTHETIC APERTURE RADAR TARGET RECOGNITION UTILIZING SPIKING NEUROMORPHIC NETWORKS

(71) Applicant: HRL LABORATORIES, LLC, Malibu, CA (US)

(72) Inventors: Qin Jiang, Park Oaks, CA (US); Nigel D. Stepp, Santa Monica, CA (US); Praveen K. Pilly, Tarzana, CA (US); Jose Cruz-Albrecht, Oak Park, CA (US)

(73) Assignee: HRL Laboratories, LLC, Malibu, CA (US)

(*) Notice: Subject to any disclaimer, the term of this patent is extended or adjusted under 35 U.S.C. 154(b) by 276 days.

(21) Appl. No.: 15/784,841

(22) Filed: Oct. 16, 2017

(51) Int. Cl.
*G01S 13/90* (2006.01)
*G06N 3/063* (2006.01)
*G06N 3/02* (2006.01)
*G06T 9/00* (2006.01)
*G06N 20/00* (2019.01)
(Continued)

(52) U.S. Cl.
CPC ............ *G01S 13/904* (2019.05); *G01S 7/417* (2013.01); *G06N 3/02* (2013.01); *G06N 3/063* (2013.01); *G01S 13/89* (2013.01); *G06K 9/00369* (2013.01); *G06N 3/049* (2013.01); *G06N 20/00* (2019.01); *G06T 9/002* (2013.01)

(58) Field of Classification Search
CPC .......... G06N 3/049; G06N 3/08; G06N 3/063; G06N 3/02; G06N 3/0635; G06N 20/00; G06N 3/0454; G06N 3/06; G06N 3/084; G06N 3/088; G06N 3/0445; G06N 5/025; G06K 9/0063; G06K 9/00744; G06K 9/00805; G06K 9/46; G06K 9/52; G06K 9/6232; G06K 9/66; G06K 9/00624; G06K 9/4623; G06K 9/6267; G06K 9/6292; G06K 9/00369; G06K 9/629; G06T 7/246; G06T 2200/04; G06T 9/002; G06T 2207/10044; G05B 2219/40499; G01S 13/86; G01S 7/417; G01S 13/90; G01S 13/89; G01S 17/89; G01S 13/426; G01S 13/904; G01S 13/9058; G01S 13/867; G01S 7/292; G01S 2007/356; G06F 17/10; H04N 19/117
USPC .............................. 706/15; 342/25 R, 89, 90
See application file for complete search history.

(56) References Cited

U.S. PATENT DOCUMENTS 4,954,963 A * 9/1990 Penz ........................ G01S 7/292
706/25
5,467,428 A * 11/1995 Ulug ...................... G06N 20/00
706/25
(Continued)

OTHER PUBLICATIONS

U.S. Appl. No. 15/199,800, filed Jun. 30, 2016 (45 pages).
U.S. Appl. No. 15/631,307, filed Jun. 23, 2017 (46 pages).

*Primary Examiner* — Olumide Ajibade Akonai
(74) *Attorney, Agent, or Firm* — Lewis Roca Rothgerber Christie, LLP

(57) ABSTRACT

A system configured to identify a target in a synthetic aperture radar signal includes: a feature extractor configured to extract a plurality of features from the synthetic aperture radar signal; a spiking neural network configured to encode the features as a plurality of spiking signals; a readout neural layer configured to compute a signal identifier based on the spiking signals; and an output configured to output the signal identifier, the signal identifier identifying the target.

25 Claims, 9 Drawing Sheets

(51) Int. Cl.
*G06N 3/04* (2006.01)
*G06K 9/00* (2006.01)
*G01S 13/89* (2006.01)
*G01S 7/41* (2006.01)

(56) References Cited

U.S. PATENT DOCUMENTS

| | | | | |
|---|---|---|---|---|
| 6,894,639 B1 * | 5/2005 | Katz | ............... | G01S 7/417 342/159 |
| 6,943,724 B1 * | 9/2005 | Brace | ............... | G01S 13/9029 342/175 |
| 7,289,060 B1 * | 10/2007 | Abatzoglou | ............... | G01S 7/412 342/175 |
| 7,671,786 B2 * | 3/2010 | Jain | ............... | G01S 7/415 342/28 |
| 8,930,291 B1 | 1/2015 | Srinivasa et al. | | |
| 8,977,578 B1 | 3/2015 | Cruz-Albrecht et al. | | |
| 9,275,328 B1 | 3/2016 | Minkovich et al. | | |
| 9,373,038 B2 * | 6/2016 | Richert | ............... | G06N 3/08 |
| 9,515,789 B2 | 12/2016 | Zhang et al. | | |
| 2013/0073493 A1 * | 3/2013 | Modha | ............... | G06N 3/049 706/25 |
| 2013/0170708 A1 * | 7/2013 | Willis | ............... | G01S 13/88 382/103 |
| 2016/0019458 A1 * | 1/2016 | Kaufhold | ............... | G06N 3/0454 342/25 F |
| 2016/0379092 A1 * | 12/2016 | Kutliroff | ............... | G06N 3/04 382/158 |
| 2017/0236051 A1 * | 8/2017 | van der Made | ............... | G06N 3/049 706/27 |
| 2017/0350974 A1 * | 12/2017 | Korchev | ............... | G01S 7/412 |
| 2017/0372194 A1 * | 12/2017 | Pantazi | ............... | G06N 3/049 |
| 2018/0018553 A1 * | 1/2018 | Bach | ............... | G06F 17/2765 |
| 2018/0174024 A1 * | 6/2018 | Lin | ............... | G06N 3/049 |
| 2018/0225562 A1 * | 8/2018 | van der Made | ............... | G06N 3/049 |
| 2018/0276530 A1 * | 9/2018 | Paul | ............... | G06N 3/049 |
| 2019/0011534 A1 * | 1/2019 | Trotta | ............... | G01S 7/412 |

* cited by examiner

SYSTEM AND METHOD FOR SYNTHETIC APERTURE RADAR TARGET RECOGNITION UTILIZING SPIKING NEUROMORPHIC NETWORKS

CROSS-REFERENCE TO RELATED APPLICATIONS

This application is related to U.S. Pat. No. 8,930,291, issued on Jan. 6, 2015 and titled "CORTICAL NEUROMORPHIC NETWORK, SYSTEM AND METHOD," U.S. Pat. No. 8,977,578, issued on Mar. 10, 2015 and titled "SYNAPTIC TIME MULTIPLEXING NEUROMORPHIC NETWORK THAT FORMS SUBSETS OF CONNECTIONS DURING DIFFERENT TIME SLOTS," U.S. Pat. No. 9,275,328, issued on Mar. 1, 2016 and titled "NEUROMORPHIC COMPILER," U.S. Pat. No. 9,515,789, issued on Dec. 6, 2016 and titled "MIMO-OFDM SYSTEM FOR ROBUST AND EFFICIENT NEUROMORPHIC INTER-DEVICE COMMUNICATION," U.S. patent application Ser. No. 15/199,800, filed on Jun. 30, 2016 and titled "NEURAL INTEGRATED CIRCUIT WITH BIOLOGICAL BEHAVIORS," and U.S. patent application Ser. No. 15/631,307, filed on Jun. 23, 2017 and titled "NEUROMORPHIC PROCESSOR FOR WIDEBAND SIGNAL ANALYSIS," the contents of all of which are incorporated herein by reference.

BACKGROUND

Synthetic aperture radar (SAR) is widely used for target imaging and target recognition utilizing radio frequency (RF) electromagnetic waves. In SAR systems, electromagnetic waves are emitted toward a target and the reflected waves are collected by a radar antenna. Because SAR data is able to provide reflected RF signals from a target at a high resolution, the two-dimensional (2D) and/or three-dimensional (3D) shape of the target can be computed from the raw SAR data.

Generally, existing techniques use the raw SAR data called phase history data to form target images, such as bitmaps, and the target images are used for target recognition, such as by displaying the target images on a screen for viewing by a human operator. Forming target images from raw SAR data is a computationally intensive computing process, which requires significant computing power, which may make real-time target recognition difficult in many applications, especially where there are constraints on the size, weight, and power (SWAP) of the hardware.

A spiking neuromorphic network is inspired by the human brain in that it process signals in the spiking domain, where all of the signals are represented by spiking sequences. On average, spiking neuromorphic networks consume very little energy because energy is only consumed when there is a spike and because, most of the time, there is no spike.

SUMMARY

Aspects of embodiments of the present invention relate to a system and method for recognizing and classifying targets in raw SAR data utilizing spiking neuromorphic networks.

According to one embodiment of the present invention, a method for identifying a target in a synthetic aperture radar signal includes: extracting, by a feature extractor, a plurality of features from the synthetic aperture radar signal; encoding, by a spiking neural network, the features as a plurality of spiking signals; computing, by a readout neural layer, a signal identifier based on the spiking signals; and outputting the signal identifier from the readout neural layer, the signal identifier identifying the target.

The plurality of features may include an amplitude of the synthetic aperture radar signal.

The plurality of features may include an off-amplitude of the synthetic aperture radar signal.

The plurality of features may include a positive phase of the synthetic aperture radar signal.

The plurality of features may include a negative phase of the synthetic aperture radar signal.

The readout neural layer may include a linear classifier.

The spiking neural network and the readout neural layer may be implemented by a neuromorphic chip.

The method may further include computing average spiking rates from the spiking signals, wherein the computing the signal identifier is computed based on the average spiking rates.

The spiking neural network may include: an input layer configured to receive the features; an excitatory neuron layer; and an inhibitory neuron layer, the input layer being configured to supply spiking signals to the excitatory neuron layer and the inhibitory neuron layer, the inhibitory neuron layer being configured to supply spiking signals to the inhibitory neuron layer and the excitatory neuron layer, the excitatory neuron layer being configured to supply spiking signals to the inhibitory neuron layer and the excitatory neuron layer, and the excitatory neuron layer including output neurons configured to output the spiking signals to the readout neural layer.

The method may further comprise receiving the synthetic aperture radar signal.

According to one embodiment of the present invention, a system configured to identify a target in a synthetic aperture radar signal includes: a feature extractor configured to extract a plurality of features from the synthetic aperture radar signal; a spiking neural network configured to encode the features as a plurality of spiking signals; a readout neural layer configured to compute a signal identifier based on the spiking signals; and an output configured to output the signal identifier, the signal identifier identifying the target.

The plurality of features may include an amplitude of the synthetic aperture radar signal.

The plurality of features may include an off-amplitude of the synthetic aperture radar signal.

The plurality of features may include a positive phase of the synthetic aperture radar signal.

The plurality of features may include a negative phase of the synthetic aperture radar signal.

The readout neural layer may include a linear classifier.

The spiking neural network and the readout neural layer may be implemented by a neuromorphic chip.

The readout neural layer may be configured to compute average spiking rates from the spiking signals, and wherein the readout neural layer is configured to compute the signal identifier based on the average spiking rates.

The spiking neural network may include: an input layer configured to receive the features; an excitatory neuron layer; and an inhibitory neuron layer, the input layer being configured to supply spiking signals to the excitatory neuron layer and the inhibitory neuron layer, the inhibitory neuron layer being configured to supply spiking signals to the inhibitory neuron layer and the excitatory neuron layer, the excitatory neuron layer being configured to supply spiking signals to the inhibitory neuron layer and the excitatory neuron layer, and the excitatory neuron layer including output neurons configured to output the spiking signals to the readout neural layer.

The system may further include an input configured to receive the synthetic aperture radar signal.

According to one embodiment of the present invention, a method for training a system for identifying a target in a synthetic aperture radar signal, the system including a feature extractor, a spiking neural network, and a readout neural layer, includes: extracting, by a feature extractor, a plurality of features from a plurality of labeled synthetic aperture radar training signals; encoding, by a spiking neural network, the features as a plurality of spiking signals; and training a readout neural layer based on the plurality of spiking signals and the labeled synthetic aperture radar training signals.

The readout neural layer may include a linear classifier, the linear classifier including a plurality of classifier weights, and wherein the training the readout neural layer includes applying a rank-1 learning rule to compute the classifier weights.

The spiking neural network and the readout neural layer may be implemented by a neuromorphic chip.

The plurality of features may include an amplitude and an off-amplitude of the synthetic aperture radar signal.

The plurality of features may include a positive phase and a negative phase of the synthetic aperture radar signal.

The spiking neural network may be configured in accordance with a plurality of parameters, the parameters being computed in accordance with a parameter search process and based on the labeled synthetic aperture radar training signals.

The parameter search process may include: initializing a set of parameters; computing a set of features based on the labeled synthetic aperture radar training signals; configuring the spiking neural network based on the set of parameters; generating, by the spiking neural network, a plurality of spiking sequences from the set of features; training a readout layer based on the spiking sequences and a plurality of labels of the labeled synthetic aperture radar training signals; computing a classification rate; determining that the classification rate fails to exceed a threshold; and updating the parameters based on the classification rate.

The parameter search process may apply a greedy search.

The spiking neural network may include: an input layer configured to receive the features; an excitatory neuron layer; and an inhibitory neuron layer, the input layer being configured to supply spiking signals to the excitatory neuron layer and the inhibitory neuron layer, the inhibitory neuron layer being configured to supply spiking signals to the inhibitory neuron layer and the excitatory neuron layer, the excitatory neuron layer being configured to supply spiking signals to the inhibitory neuron layer and the excitatory neuron layer, and the excitatory neuron layer including output neurons configured to output the spiking signals to the readout neural layer.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
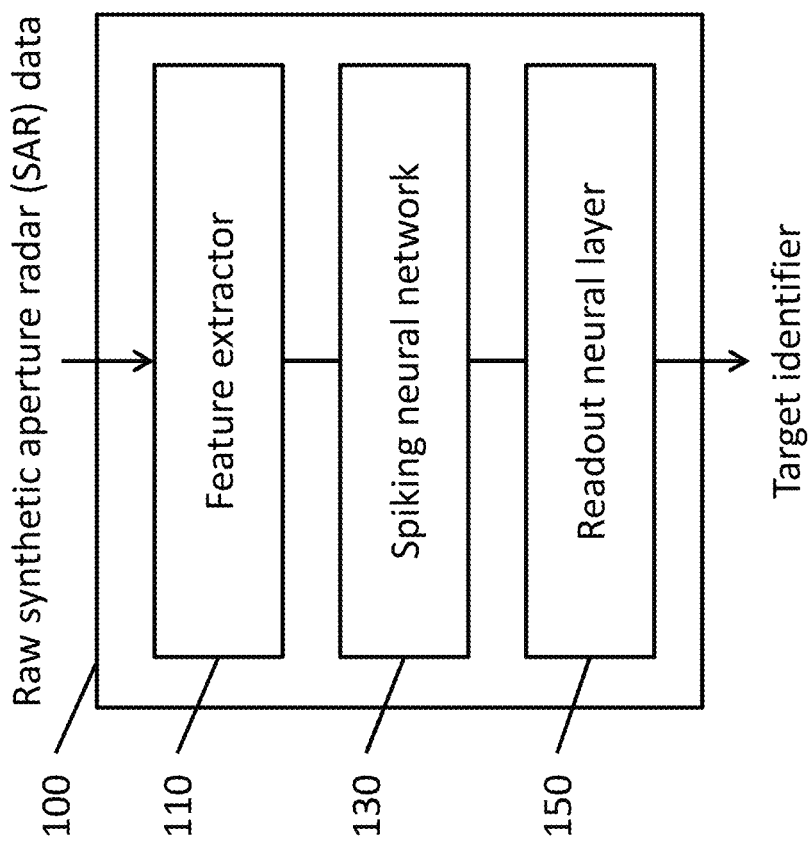
FIG. 1 is a block diagram of a system for identifying or classifying a target in raw synthetic aperture radar (SAR) data according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Synthetic aperture radar (SAR) data is widely used in both civilian and military applications, such as geographic survey, target recognition, and surveillance. As discussed above, typical SAR based systems perform target recognition by first generating an image from the received raw SAR data (or phase history data), and then performing target recognition on the image. The image synthesis process is generally computationally intensive, and therefore real-time SAR image formation requires large size, weight, and power consumption (SWAP) processing hardware which is not suitable for many applications and platforms. This makes it difficult to apply image formation techniques in real-time, especially in environments where SWAP are constrained, such as in an unmanned aerial vehicle (UAV).

Therefore aspects of embodiments of the present invention are directed to systems and methods for recognizing targets from raw SAR data without an intermediate step of synthesizing images from the raw SAR data. Aspects of embodiments of the present invention enable the recognition of targets from SAR data in real-time and with reduced power consumption, which may be particularly useful for applications with particular performance requirements and power constraints. In some embodiments of the present invention, at least some aspects are implemented in a neuromorphic chip, which can operate at high performance and with low power consumption.

Aspects of embodiments of the present invention relate to a signal recognition system configured to identify or classify a target found in raw SAR data utilizing a spiking neuromorphic network that that generates spiking sequences based on features computed from complex raw SAR data, such as phase and amplitude. For example, the system may be configured to identify whether the raw SAR data was reflected off a particular type of aircraft (e.g., distinguishing between specific models of aircraft), or a particular model of a car (e.g., a Toyota Camry versus a Honda Accord versus a Jeep). In some embodiments, a neuromorphic spiking network encodes a set of features computed from the raw SAR data and a trained linear classifier classifies targets from the encoded spiking sequences based on characteristics learned during a training process.

Neuromorphic computing is a biologically-inspired approach based on observations that the human brain is able to compute complex functions while utilizing a very small amount of power. For example, the human brain has excellent capabilities in object recognition. In some neuromorphic computing devices, the physical hardware of the device implements electronic "neurons" that communicate with one another through spiking sequences (e.g., voltage pulses), in a manner that resembles the spiking sequences of signals between neurons in a human brain.

As such, one approach to applying neuromorphic computing to object learning and recognition is to encode features of the input data in the spiking signal domain. A binary spiking neural network may be computationally more efficient (e.g., energy efficient) than a real-valued neural network because processing spiking signals (binary sequences) consumes much less power than processing real-valued signals. Therefore, in some embodiments of the present invention, recognizing SAR targets utilizing a spiking neural network will greatly improve efficiency of power consumption and accuracy of target recognition than a comparable real-valued neural network.

FIG. 1 is a block diagram of a system for identifying or classifying a target in raw synthetic aperture radar (SAR) data according to one embodiment of the present invention. As shown in FIG. 1, in one embodiment, a system 100 for identifying or classifying a target includes: a feature extractor 110 that is configured to extract features from raw SAR data; a spiking neural network 130 configured to encode the extracted SAR features as spiking sequences; and a readout neural layer 150, which includes a classifier (e.g., a supervised linear classifier) that is configured to classify different SAR targets from spiking sequences generated from the SAR features, and to output an identification of the target (a "target identifier"). The readout layer may be trained by a supervised learning technique. Experimental results show that implementations of embodiments of the present invention are effective in classifying targets from raw SAR data.

Figure 2:
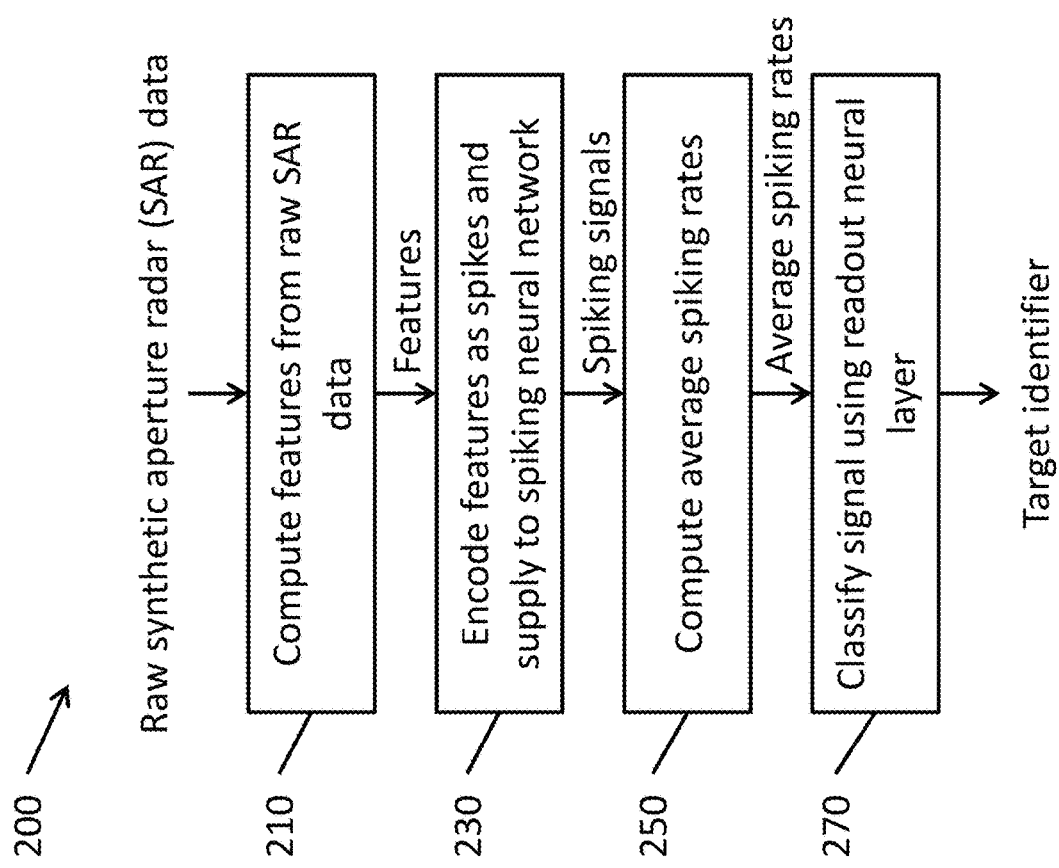
FIG. 2 is a flowchart illustrating a method for identifying or classifying a target in raw synthetic aperture radar (SAR) data according to one embodiment of the present invention.

FIG. 2 is a flowchart illustrating a method for identifying or classifying a target in raw synthetic aperture radar (SAR) data according to one embodiment of the present invention.

As such, aspects of embodiments of the present invention relate to classifying SAR targets utilizing a spiking neural network that is very efficient in power consumption; and/or classifying SAR targets without forming SAR images.

Synthetic Aperture Radar (SAR) Features

In operation 210, the feature extractor 110 receives synthetic aperture radar (SAR) raw data (e.g., from a radar antenna), and computes features from the SAR raw data. Raw SAR data includes two-dimensional (2D) complex phase history data, which does not have an intuitive or natural mapping to spiking signals. In some embodiments of the present invention, four different features are computed from raw SAR data: amplitude, off-amplitude, positive phase, and negative phase.

Figure 3:
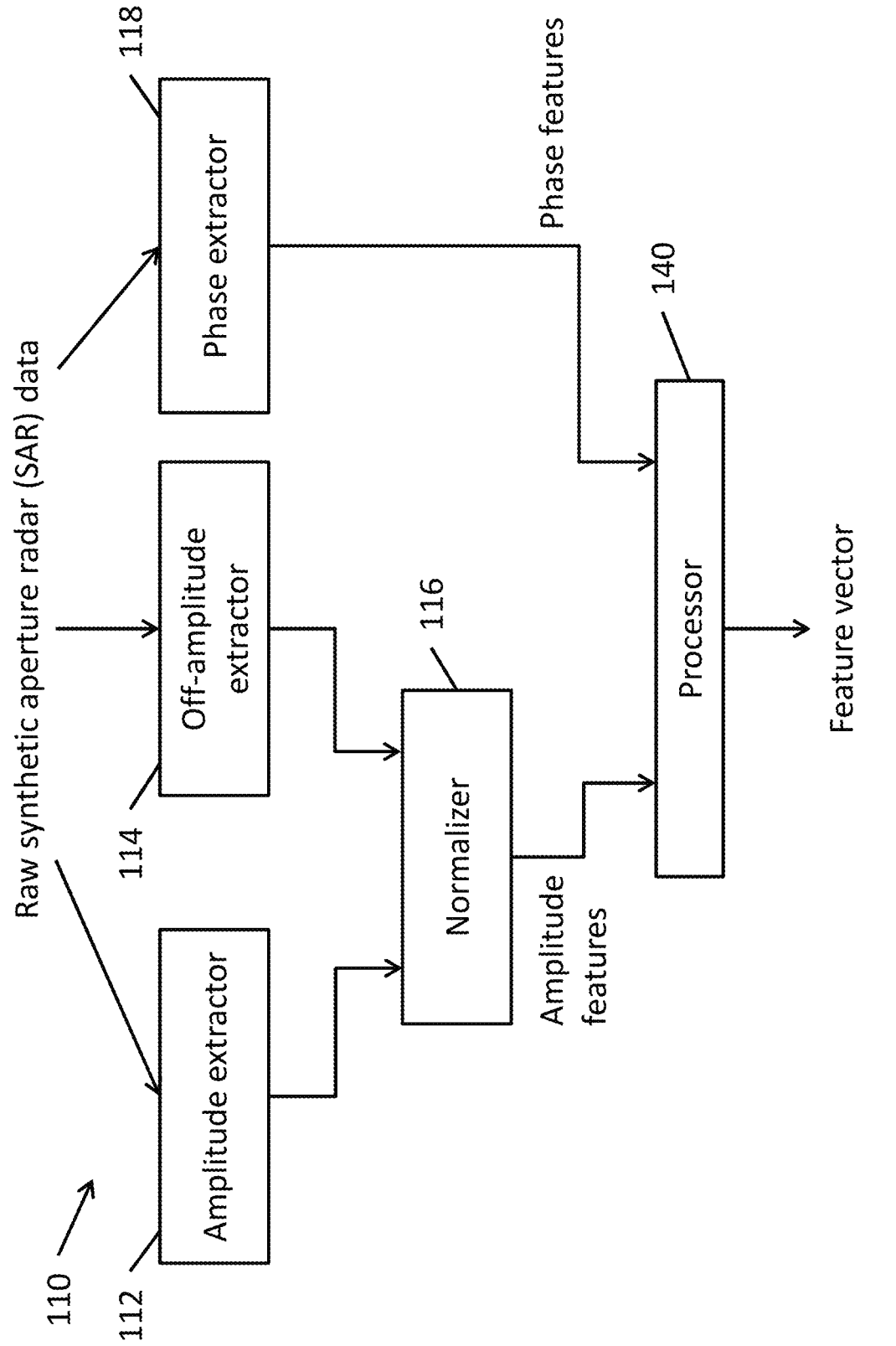
FIG. 3 is a block diagram of a feature extractor according to one embodiment of the present invention configured to compute features from raw SAR data.

FIG. 3 is a block diagram of a feature extractor 110 according to one embodiment of the present invention configured to compute features from raw SAR data.

Figure 4:
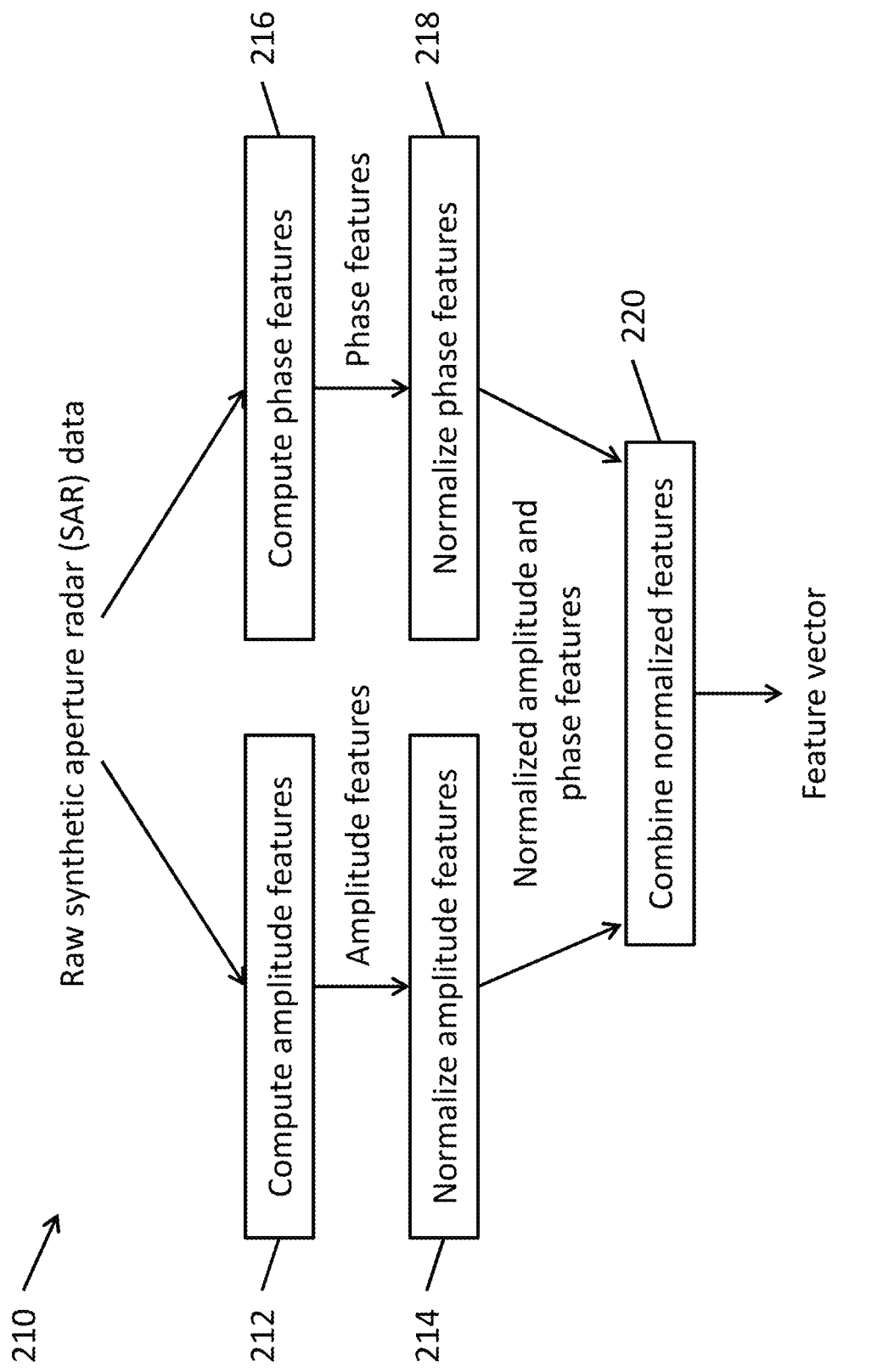
FIG. 4 is a flowchart illustrating a method for computing features from a segment of the raw SAR data according to one embodiment of the present invention.

FIG. 4 is a flowchart illustrating a method 210 for computing features from a segment of the raw SAR data according to one embodiment of the present invention.

Given that the raw SAR data is a matrix or two-dimensional array of complex values, the data point of the SAR data c at position (i,j) in the two-dimensional array is given by $c_{ij}=a_{ij}+jb_{ij}$ (where the coefficient j refers to the unit imaginary number $j=\sqrt{-1}$, and the subscripted i and j are indices into the two-dimensional array). In operation 212, the amplitude extractor 112 extracts the amplitude feature $Am_{ij}$ for each data point $c_{ij}$ (e.g., for each coordinate pair (i,j)) in accordance with Equation 1:

$$Am_{ij} = \sqrt{a_{ij}^2 + b_{ij}^2}$$

and the off-amplitude extractor 114 extracts the off-amplitude feature $Am_{ij}^*$ for each data point $c_{ij}$ in accordance with Equation 2:

$$Am_{ij}^* = Am_{max} - Am_{ij}$$

where $$Am_{max} = \max(Am_{ij})$$

Because the phase features (described below) have a range of $[0.0, \pi]$, in one embodiment, the normalizer 116 normalizes the amplitude features to the same dynamic range of $[0.0, \pi]$. As such, the normalized amplitude and off-amplitude features $A\overline{m}_{ij}$ and $A\overline{m}_{ij}^*$ are given by Equations 3 and 4:

$$A\overline{m}_{ij} = \pi * \frac{Am_{ij}}{Am_{max}}$$

$$A\overline{m}_{ij}^* = \pi * \frac{Am_{ij}^*}{Am_{max}}$$

The phase extractor 118 computes the phase values $ph_{ij}$ for each data point $c_{ij}=a_{ij}+jb_{ij}$ in accordance with Equation 5:

$$ph_{ij} = \tan^{-1}\left(\frac{b_{ij}}{a_{ij}}\right)$$

where the positive phase $ph_{ij}^+$ is given by Equation 6:

$$ph_{ij}^+ = \begin{cases} ph_{ij}, & ph_{ij} > 0 \\ 0, & \text{otherwise} \end{cases}$$

and the negative phase $ph_{ij}^-$ is calculated by Equation 7:

$$ph_{ij}^- = \begin{cases} -ph_{ij}, & ph_{ij} < 0 \\ 0, & \text{otherwise} \end{cases}$$

In operation 220, the processor 140 combines the normalized amplitude features $A\overline{m}_{ij}$ and $A\overline{m}_{ij}^*$ with the phase features $ph_{ij}^+$ and $ph_{ij}^-$, and, as such, for every raw data point $c_{ij}$ of the raw SAR data, the feature extractor computes a feature vector $ft_{ij}$ given as Equation 8:

$$ft_{ij} = [A\overline{m}_{ij}, A\overline{m}_{ij}^*, ph_{ij}^+, ph_{ij}^-]^T$$

Because the raw SAR data is a 2D complex array, the feature vectors can be arranged based on row data points or column data points to generate a sequence of feature vectors for the raw data array.

In one embodiment, in operation 230, each value of a real-valued feature vector is converted into a corresponding spiking sequence, where the spiking sequence is made up of spikes that are randomly (or pseudo-randomly) generated in accordance with a Poisson distribution having a mean spiking rate that corresponds to the real value. According to one embodiment of the present invention, the real valued vectors are converted into spiking sequences utilizing a Poisson or exponential distribution (the exponential distribution may be used as a computationally simpler approximation of the Poisson distribution). In particular, the real values of the feature vector are treated as average (e.g., mean) values of the distribution, and a random number generator is used to produce spikes such that the randomly generated spiking sequences have mean values corresponding to the values of the feature vector. For example, each feature vector $ft_{ij}$, which includes four different features, can be converted into four different spiking sequences, each spiking sequence having a spiking rate distribution in accordance with the real value of the corresponding feature.

Because the values of the feature vector generally change over time (e.g., the values may differ from one vector (row vector or column vector) of the SAR data to the next), the generated spiking sequences may have varying mean values over time.

Spiking Neural Networks

Figure 5:
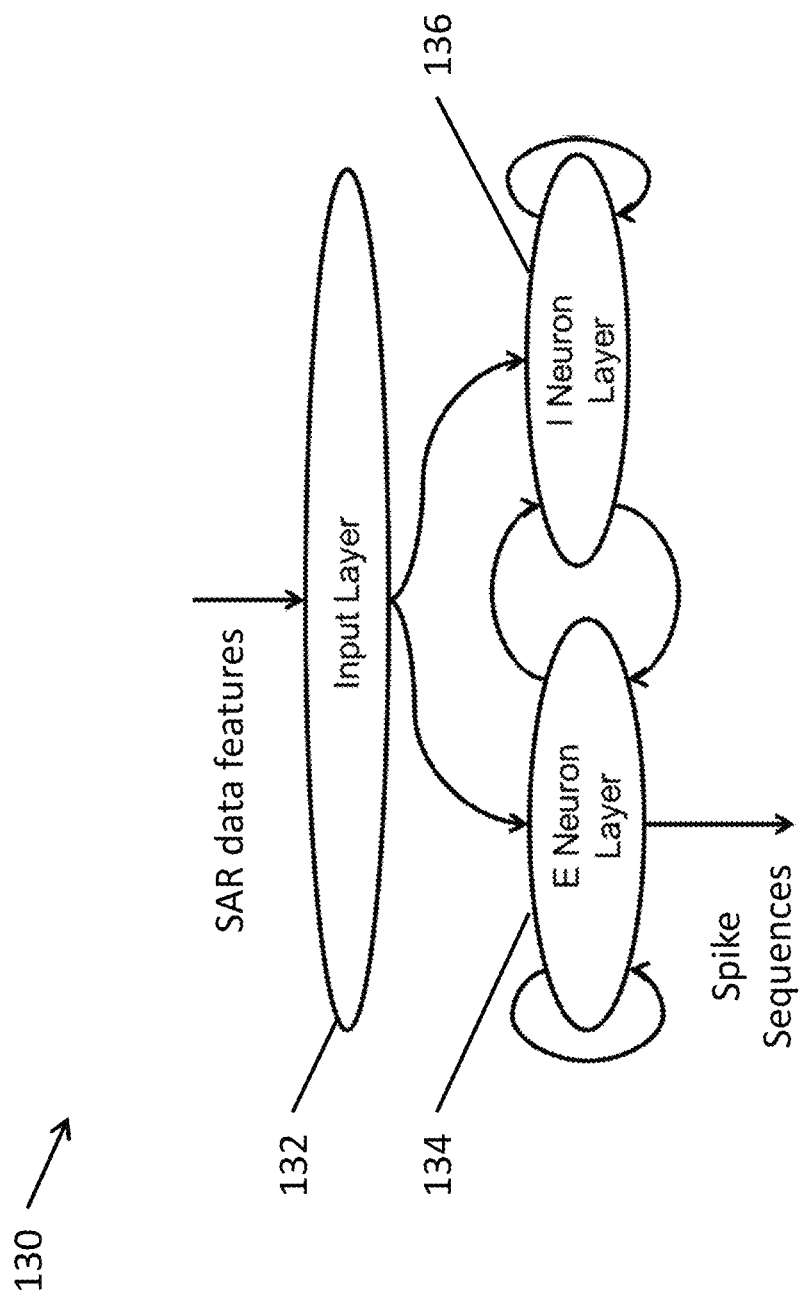
FIG. 5 is a schematic diagram of a neuromorphic spiking network according to one embodiment of the present invention.

FIG. 5 is a schematic diagram of a neuromorphic spiking network according to one embodiment of the present invention. As shown in FIG. 5, the neuromorphic spiking network 130 includes an input layer 132, and excitatory neuron layer 134, and an inhibitory neuron layer 136. The neuromorphic spiking network 130 shown in FIG. 5 generates a plurality of output spiking sequences from a plurality of excitatory neurons of the excitatory neuron layer.

In one embodiment, the neuromorphic spiking network 130 is implemented by a general purpose processor configured to simulate the input layer 132, the excitatory neuron layer 134, the inhibitory neuron layer 136, and the connections between the layers. In other embodiments, the neuromorphic spiking network 130 is implemented by a neuromorphic chip such as a neuromorphic chip produced by HRL Laboratories of Malibu, Calif., or the TrueNorth neural net chip produced by International Business Machines Corporation (IBM) of Armonk, N.Y. In circumstances of limited size, weight, and power (SWAP), a neuromorphic chip may provide reduced SWAP in comparison to a general purpose processor.

In the neuromorphic spiking network 130, every neuron in the input layer is connected to one excitatory neuron (selected randomly) in the excitatory neuron layer 134 and one inhibitory neuron (selected randomly) in the inhibitory neuron layer 136. The connection is associated with a weight w (a connection weight), which is fixed based on a parameter search procedure, described in more detail below. Every neuron in the excitatory neuron layer 134 is randomly connected to a group of excitatory neurons in the excitatory neuron layer 134 as well as a group of inhibitory neurons in the inhibitory neuron layer 136. The sizes of these groups are referred to as "connection ratios" and are also determined by the parameter search procedure. Similarly, every inhibitory neuron in the inhibitory neuron layer 136 is connected to a group of inhibitory neurons of the inhibitory neuron layer 136 and a group of excitatory neurons of the excitatory neuron layer 134 at corresponding connection ratios. At least some of the excitatory neurons in the excitatory neuron layer 134 are output neurons that are connected to the readout neural layer 150, as described in more detail below. For the sake of convenience, the number of output neurons will be referred to herein as O.

In some embodiments of the present invention, such as in a production device, where a set of parameters P has already been determined through the parameter search procedure, the spiking neural network can be implemented utilizing a dedicated circuit based on the fixed parameters. The dedicated circuit may be, for example, a field programmable gate array (FPGA) or an application specific integrated circuit (ASIC).

In one embodiment, each neuron is modeled by the integrate-and-fire model, where a neuron is modeled as a capacitor C in parallel with a resistor R driven by a current I(t). In a leaky integrate-and-fire model, the neuron firing (e.g., emission of a spike) is described by the dynamic equation of a neuron membrane potential and current, as given by Equation 9, below:

$$\tau_m \frac{du(t)}{dt} = -u(t) + RI(t)$$

where u(t) is the membrane potential (e.g., the voltage across the capacitor C), l(t) is the membrane current, and the constants $\tau_m$ and R are the membrane time constant and resistance of the neuron, respectively. When the membrane potential u(t) is greater than or equal to a firing threshold $V_{th}$ at time $t_f$, the neuron outputs a spike which is scaled by the connection weight $w\delta(t-t_f)$ (in the case of an inhibitory neuron, the spike has the opposite sign from the excitatory neuron, e.g., $-w\delta(t-t_f)$), and the capacitor C is reset (e.g., set to zero volts by shorting the capacitor to ground). The firing thresholds $V_{th}$ for the excitatory neurons and the inhibitory neurons are different and determined by the parameter search procedure. According to one embodiment, the length of the spike $\delta$ is equal to one time step (e.g., one sample).

Qualitatively, as input signals (e.g., spikes or the input values from the feature vector) arrive at the input of the neuron, the spikes accumulate over time in a capacitor C. The "leakiness" of the neuron causes the accumulated voltage at the capacitor C to decrease over time. However, if sufficient spiking energy arrives at the neuron (e.g., spikes can arrive at various rates and with various voltages and/or widths), then the voltage at the capacitor C may eventually exceed the threshold voltage $V_{th}$, at which point the neuron fires by emitting a spike on its output, and by resetting the capacitor to an initial voltage.

The values of the feature vector $ft_{ij}$ (see Equation 8, above) are supplied, as the spiking sequences generated in operation 230, to the inputs of the neurons of the input layer 132 of the neuromorphic spiking network 130. The spikes are output from the input layer 132 to the excitatory neuron layer 134 and the inhibitory neuron layer 136, as described above, and spikes are propagated through the network along the connections and scaled by the weights of the connections. As shown in FIG. 5, a plurality of output spiking sequences is generated by the spiking neural network 130, where each spiking sequence corresponds to the output of one of the output neurons of the excitatory neuron layer.

The spiking sequence that is output from the neuromorphic spiking network 130 is supplied to a readout neural layer 150, which converts the spiking sequences into a classification or identification of the target or targets, if any, that are found in the input raw SAR signal. The readout neural layer 150 includes Q readout neurons, where Q is the number of classes of different types or classes of targets that the system is configured to detect or recognize.

According to one embodiment of the present invention, the readout neural layer 150 is a linear classifier that uses the average spiking rates to classify the different targets found in the raw SAR data. For example, assuming that the spiking sequences corresponding to an i-th segment (or window) of the output spiking sequences are given by $spk_i(t)$ (e.g., for any value t, $spk_i(t)$ is a vector of length equal to the number of output neurons of the excitatory neuron layer 134), and assuming a segment (or window) length of N, then the readout neural layer 150 computes, in operation 250, average spiking rates $r_i$ ($r_i$ is also a vector with length equal to the number of output neurons of the excitatory neuron layer 134) for the i-th signal segment in accordance with Equation 10:

$$r_i = \frac{1}{N}\sum_{t=1}^{N} spk_i(t)$$

The readout neural layer 150 maps the average spiking rates $r_i$ to target class $c_i$ based on a plurality of classifier weights arranged in a mapping weight matrix W in accordance with Equation 11:

$$c_i = Wr_i$$

where, in one embodiment, the values of the classifier weights of the mapping weight matrix W are learned through a supervised learning rule. A process for automatically learning the values of the mapping weight matrix W from training data is described in more detail below with respect to FIG. 6. Because there are P output neurons and therefore P spiking rates in $r_i$, and because there are Q output classes $c_i$, the mapping weight matrix W has dimensions P×Q. In one embodiment, the product $Wr_i$ gives a vector $c_i$, where the classification of the i-th segment of the spiking signals encoding the features is identified based on the highest valued entry of $c_i$.

As a result, in operation 270, the readout neural layer 150 outputs a signal identifier $c_i$ which identifies the classification of the target. For example, in an embodiment directed to reconnaissance, the signal identifier may identify the classification of the target in the SAR data as a car, a truck, or a tank.

In some embodiments, the spiking neural network 130 and the readout neural layer 150 may be implemented in an integrated device, such as an integrated circuit. In some embodiments, all of the components of the system 100 may be implemented utilizing an electronic circuit fabricated on a single substrate, such as a mixed signal chip that includes one or more digital signal processors (DSPs) and an analog neuromorphic circuit. The values of the mapping weight matrix W may be fixed in the spiking neural network 130, such as by being stored in read-only memory of the integrated circuit or physically implemented in spike generating circuit of the integrated circuit (e.g., if a spike generating circuit is controlled based on a resistance value).

Figure 6:
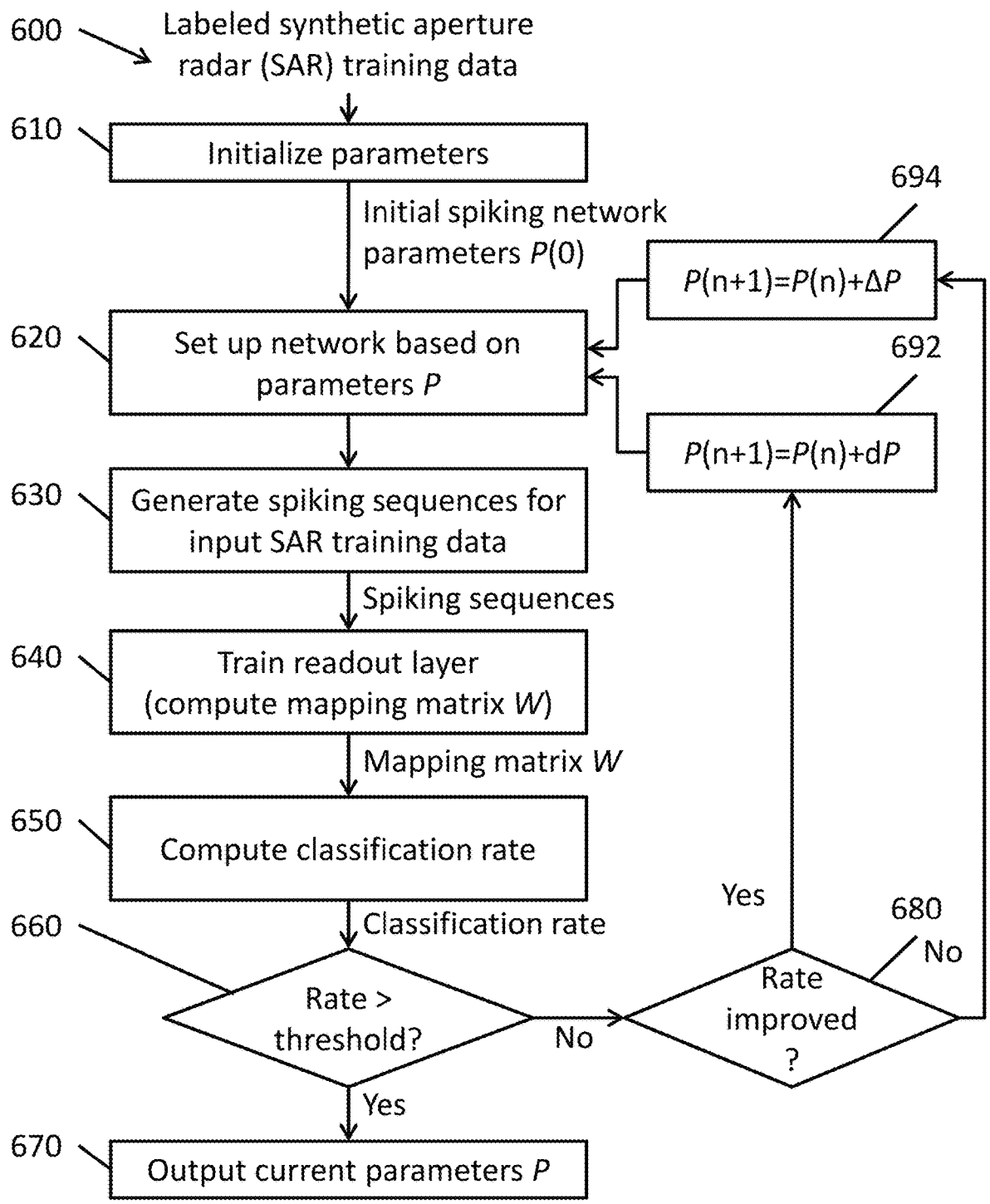
FIG. 6 is a flowchart illustrating a parameter search procedure according to one embodiment of the present invention.

The parameters P of the spiking network are computed utilizing a parameter search procedure. The procedure uses the labeled training data and testing data to find parameters that produce an accurate classification result for the given training and testing data. FIG. 6 is a flowchart illustrating a parameter search procedure 600 according to one embodiment of the present invention. The parameter search procedure 600 may be performed by a training module, e.g., a general purpose processor configured, by software, to perform the parameter search procedure.

The parameter space is a high dimensional space. As such, in some embodiments of the present invention, a greedy approach is used to search for the values of the parameters. The search result depends highly on initial values of the parameters, because it may be difficult or impossible to predict which region of the space includes the optimal parameters, and because the search may settle at a local (but not global) optimum. As such, in some embodiments, the parameters may be initialized to random values within the dynamic ranges of the parameters. In other embodiments of the present invention, mean values of the parameters are used as the initial values.

In operation 610, the training module initializes the parameters P to some initial values (e.g., initial parameters P(0)). The parameters are used to configure the spiking neural network 130. In operation 620, the spiking neural network is set up based on the parameters P (e.g., the connection ratios and the weights of the connections in the network are set up based on the parameters P). In operation 630, features that are extracted from the labeled raw SAR training data (as described above with respect to operation 210) are supplied to the spiking neural network 130 (which has been configured based on the parameters P) to generate spiking sequences.

In operation 640, the training module trains the readout layer (e.g., computing the mapping weight matrix W) based on the training data. The training process may use a supervised learning rule, such as the Rank-1 learning rule.

Generally, the Rank-1 learning rule maps the training data into a subspace such that all of the common components in the training data are removed before utilizing the training data to train a classifier. The training data, in this case, includes raw SAR data that are labeled based on the classifications such containing reflected signals from various types of vehicles (e.g., different models of cars and/or aircraft) and the like. The removal of the common components improves the efficiency of the training process, as components that do not provide information that helps in distinguishing between the various classes $c_i$ of signals need not be processed. To remove the common components in the training vectors, the training vectors are mapped into a subspace by a signal sub-space mapping matrix A as shown in Equation 12:

$$A = A - k_i \frac{k_i^T}{g_i}$$

where:

$$k_i = Ar_i$$

$$g_i = 1 + k_i^T r_i$$

where the signal sub-space mapping matrix A is learned from the training data during the training, and where $r_i$ is the i-th average spiking rate, as shown above in Equation 10.

The mapping weight matrix W can then be learned from the training data as shown in Equation 13:

$$W = W - e_i \frac{k_i^T}{g_i}$$

where the cost or error $e_i$ is given by Equation 14:

$$e_i = c_i - t_i$$

where $t_i$ is the target label for the i-th signal segment of the training SAR data (e.g., the pre-labeled classification of the segment of the training data).

As shown above in Equation 11, the mapping weight matrix W maps the input spiking rate $r_i$ to a target class $c_i$ utilizing the label target data $t_i$, where the index i is a time index. The Rank-1 method can learn both the mapping weight matrix W and a signal sub-space mapping matrix A through the same process. Beginning with time index i=0, the signal sub-space mapping matrix A is initialized to the identity matrix 1, and the mapping weight matrix W is initialized to a matrix of zeros. For each pair of the training data $((r_i, t_i)$ for i=0, 1, 2, 3, ..., N), the estimates of A and W are updated by computing:

$$c_i = W r_i$$

$$e_i = c_i - t_i$$

$$k_i = A r_i$$

$$g_i = 1 + k_i r_1$$

and then updating the matrices:

$$W = W - e_i \frac{k_i^T}{g_i}$$

$$A = A - k_i \frac{k_i^T}{g_i}$$

The process of computing the variables $c_i$, $e_i$, $k_i$, and $g_i$ (computed based on the updated matrices W and A and the i-th pair of training data $(r_i, t_i)$), and updating the matrices W and A based on the computed accordingly is repeated for all of the training data.

As such, in operation 640, the training module computes a mapping weight matrix W based on the training data.

In operation 650, the training module performs the readout operation in accordance with operations 250 and 270, e.g., by computing average spiking rates and multiplying the averages by the mapping weight matrix W.

In operation 650, the training module compares the resulting classifications $c_i$ against the labeled training data (e.g., the labeled classifications $t_i$) and calculates a classification rate (e.g., the number of correct classifications, where $c_i$ corresponds to $t_i$, divided by the total number of signal segments used for training in this way). In operation 650, the training module compares the classification rate with a threshold value. If the classification rate satisfies a threshold level (e.g., at least 70%), then the parameters P are output in operation 670 as the result of the training process. If the classification rate is too low (e.g., the accuracy of the system is too low), then the training module updates the parameters.

In more detail, in operation 680, the current classification rate is compared with the previous classification rate. If the current classification rate is higher, then, in operation 692, the values of the parameters are increased (e.g., by an amount dP which is set in accordance with a learning rate). On the other hand, if the current classification is worse, then, in operation 694, the values of the parameters are updated based on random perturbation values ΔP. In one embodiment, the random perturbation ΔP takes a value in the range from −1 to 1 (e.g., [−1, 1]) and is scaled by a factor (the search step size). As such, the values may increase or decrease when they are updated. The training module sets the parameters of the spiking neural network 130 based on the updated values, and proceeds to operation 620 to generate new spiking sequences based on the training raw SAR data features and the updated parameters.

If the rate exceeds the threshold condition, or if the process reaches a maximum number of iterations, then in operation 670 the training module outputs the final parameters. As noted above, the result of the parameter search procedure may depend on the initial parameters set in operation 610, where different sets of initial parameters may result in different final parameters, and where some sets of final parameters may be better than others. As such, in some embodiments of the present invention, the parameter search process is repeated several times, utilizing different initial parameters, in order to search more of the parameter space.

As such, the parameter search procedure generates the connection weights in the spiking neural network 130 such that the spiking signals, when averaged by the readout neural layer 150, accurately classify the targets in the raw SAR data.

Figure 7A:
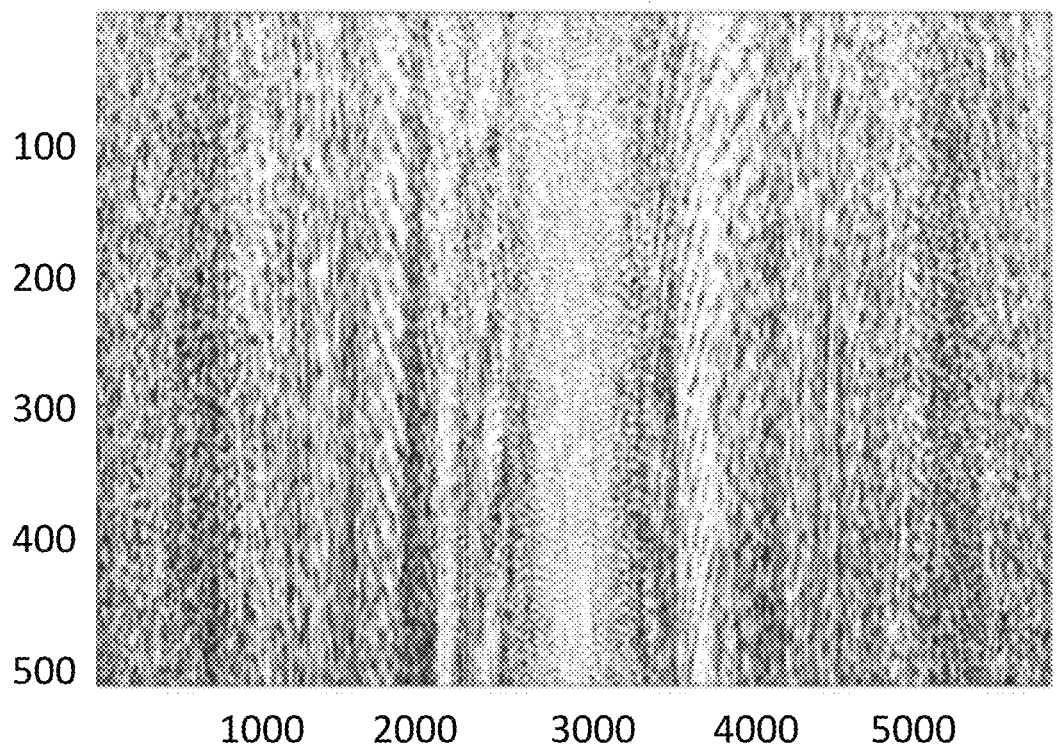
FIGS. 7A and 7B show examples of amplitudes of raw SAR data of two civilian vehicles—a Toyota Camry and a Jeep, respectively.
Figure 7B:
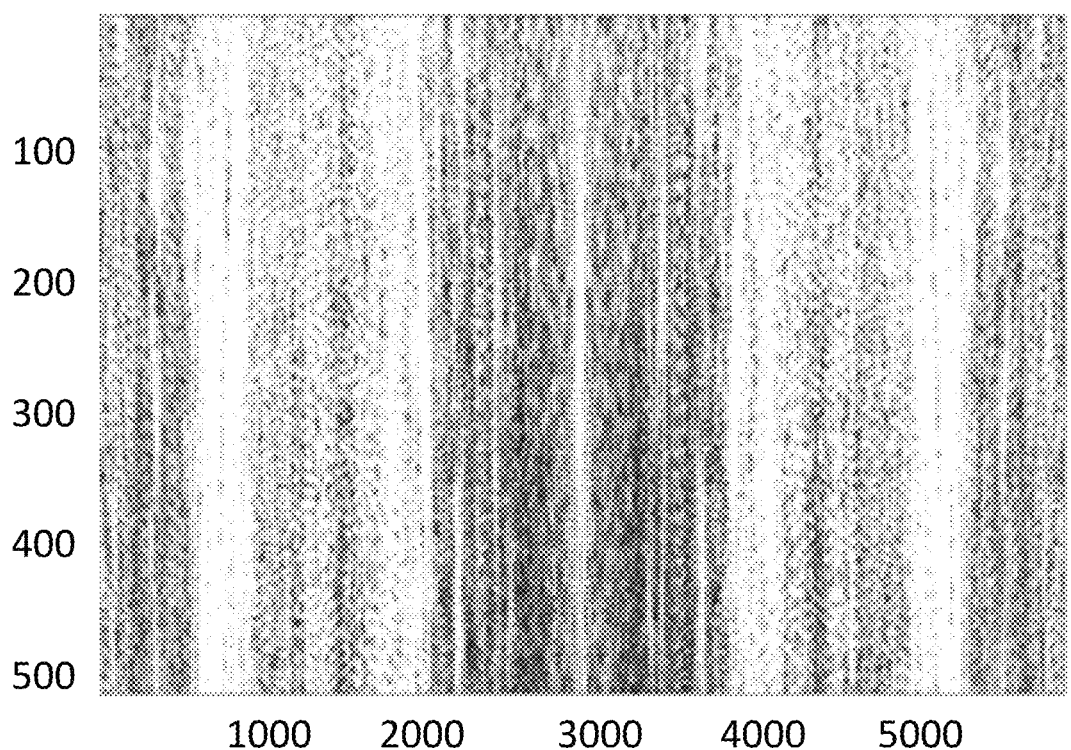
Figure 8A:
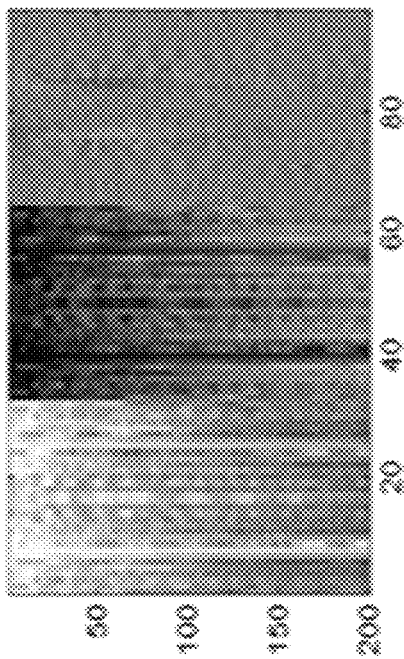
FIGS. 8A, 8B, 8C, and 8D depict examples of SAR feature vectors at different elevations for the two types of vehicles computed in accordance with an embodiment of the present invention.
Figure 8B:
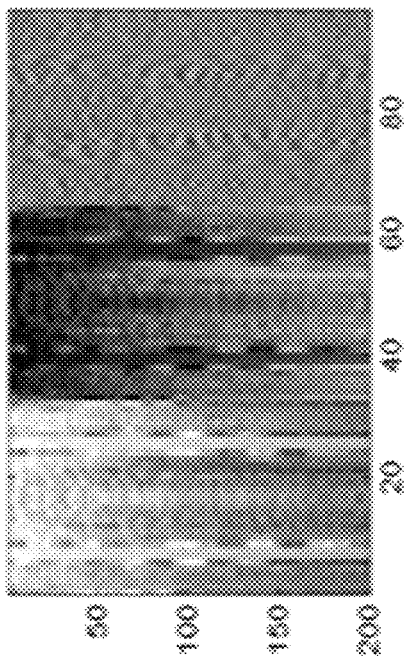
Figure 8C:
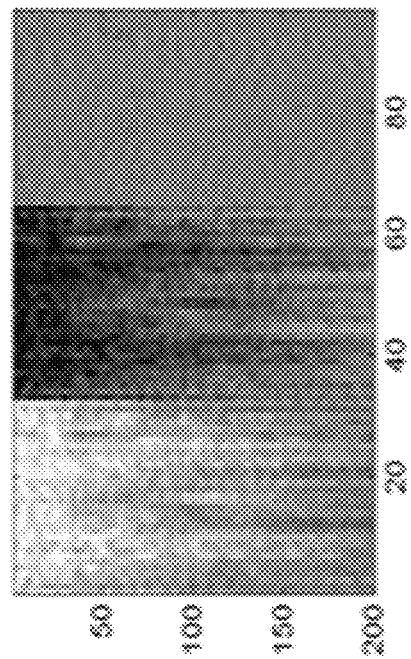
Figure 8D:
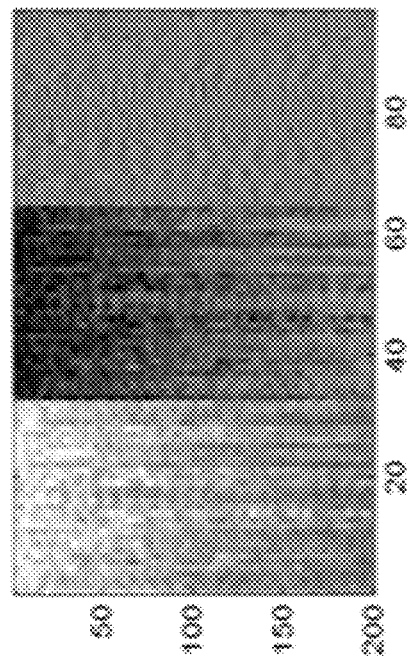

One embodiment of the present invention was implemented to test the performance of the system utilizing data captured from simulated SAR data. The testing data included simulated X-band SAR phase history of civilian vehicles. The data for each vehicle included three sets of raw SAR data collected from different elevations (e.g., from an aerial vehicle with a downward pointing SAR system) of 40 meters, 50 meters, and 60 meters. In this test, the raw SAR data of two vehicles—a Toyota Camry and a Jeep—was used. FIGS. 7A and 7B show examples of amplitudes of raw SAR data of the Toyota Camry and the Jeep, respectively.

After computing the SAR features, the SAR features were downsampled to 200×96 for each elevation. FIGS. 8A, 8B, 8C, and 8D depict examples of SAR feature vectors at different elevations for the two types of vehicles computed in accordance with an embodiment of the present invention. The first 32 columns of the feature vectors are amplitude features, the second 32 columns of the feature vectors are off-amplitude features, and the last 32 columns of the features are positive and negative phase features.

In the experiment, the feature vectors computed from the data collected at an elevation of 40 m and an elevation of 60 m were used as the training data to train the readout layer 150, and the feature vectors computed from data collected at an elevation of 50*m* were used as testing data to test the system. Before the training the readout layer 150, the training data, testing data and a parameter search procedure were used to determine the parameters of the spiking neural network 130. In the experiment, 2,400 neurons were used: 1,920 excitatory neurons for the E neuron layer 134 and 480 inhibitory neurons for the I neuron layer 136. Four hundred (400) of the excitatory neurons of the E neuron layer 134 were randomly selected to serve as the output neurons.

All connection probabilities and connection weights were determined by the parameter search procedure described above with respect to FIG. 6. Table 1 presents the network parameters obtained by the parameter search procedure through the experiment. In the experiment, row feature vectors, such as those shown in FIGS. 8A, 8B, 8C, and 8D were supplied as input vectors to the spiking neural network. Each input vector was presented to the network for 200 milliseconds. Different target feature vectors were randomly mixed in the both training data and testing data. Each target was presented 25 times in the training data and testing data.

TABLE 1

| Parameter | Value | Parameter | Value | Parameter | Value |
|---|---|---|---|---|---|
| E conn. rate | 0.12% | E conn. weight | 4.0 | E $V_{th}$ | 79.0 |
| I conn. rate | 1.51% | I conn. weight | 23.0 | I $V_{th}$ | 227.0 |
| Input weight | 33.0 | KDecay | 233.0 | | | where E refers to excitatory neurons, I refers to inhibitory neurons, and KDecay refers to the "leakiness" of the neurons. The E conn. rate refers to the percentage of all of the excitatory neurons that any given excitatory neuron is connected to (e.g., excitatory neuron to excitatory neuron connections), as well as the percentage of all of the inhibitory neurons that any given excitatory neuron is connected to (e.g., excitatory neuron to inhibitory neuron connections). Likewise, the I conn. rate refers to the percentage of all of the excitatory neurons that any given inhibitory neuron is connected to (e.g., inhibitory neuron to excitatory neuron connections), as well as the percentage of all of the inhibitory neurons that any given inhibitory neuron is connected to (e.g., inhibitory neuron to inhibitory neuron connections).

To test the classification process, 11,000 test samples were presented to the system, where each sample contained SAR data corresponding to one of two different vehicles: a Toyota Camry (5,200 samples) or a Jeep (5,800 samples)n. For each sample, the system computed a classification of the data as containing either a Camry or a Jeep. The target classification results are summarized in Table 2:

TABLE 2

| | | Computed ID | | | |
|---|---|---|---|---|---|
| True ID | | Camry | Jeep | Sum | Classification rate |
| | Camry | 4415 | 785 | 5200 | 84.90% |
| | Jeep | 2304 | 3496 | 5800 | 60.28% |
| | | | Total | 11,000 | 72.59% (Average) |

As seen in Table 2, of the 5,200 total samples of raw SAR data that actually were collected from a Camry (True ID), the system classified (Computed ID) 4,415 of those samples were correctly classified as a Camry and 785 of those samples were incorrectly classified as a Jeep. Of the 5,800 samples of raw SAR data that were actually collected from a Jeep (True ID), 2,304 of these were incorrectly classified as a Camry, and 3,496 were correctly classified as a Jeep. As such, the average classification rate is (4,415/5,200+3,496/5,800)/2=72.59%.

As such, the experimental test produced an accuracy of about 73% in average classification rate, even without forming SAR images, and through the use of a spiking neural network, both characteristics of which result in less energy consumption than comparative neural networks that process SAR images, due in part to the reduced computational requirements for SAR data based target recognition. Generally, some embodiments of the present invention compute a set of SAR features from raw SAR data, and encodes the SAR features into spiking sequences utilizing a spiking neural network. The spiking neural network converts spatial information of the SAR data into temporal sequences and enables processing SAR data in the spiking domain, which is an energy efficient technique for data processing. Averaged spiking rates of SAR data are used for target recognition by a readout neural layer trained through a supervised learning process.

Simulated SAR data of civilian vehicles was used to evaluate the system, and experimental tests show that the proposed system is effective to recognize different SAR targets without forming SAR images. Some embodiments of the present invention can be implemented by a neuromorphic chip, thereby producing a SAR target recognition system with real-time computing capabilities and very low-power consumption.

Various portions of the target classification system that refer to the use of a "processor" may be implemented with logic gates, or with any other embodiment of a processing unit or processor. The term "processing unit" or "processor" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). While, in some embodiments, the spiking neural network 130 and the readout neural layer 150 of the target classification system are implemented utilizing neuromorphic hardware, in some embodiments of the present invention, including some embodiments during a training process in which the parameters of the spiking neural network 130 are computed and the classifier weights of the readout neural layer 150 are computed, the spiking neural network 130 and the readout neural layer 150 may be simulated by a processor.

Figure 9:
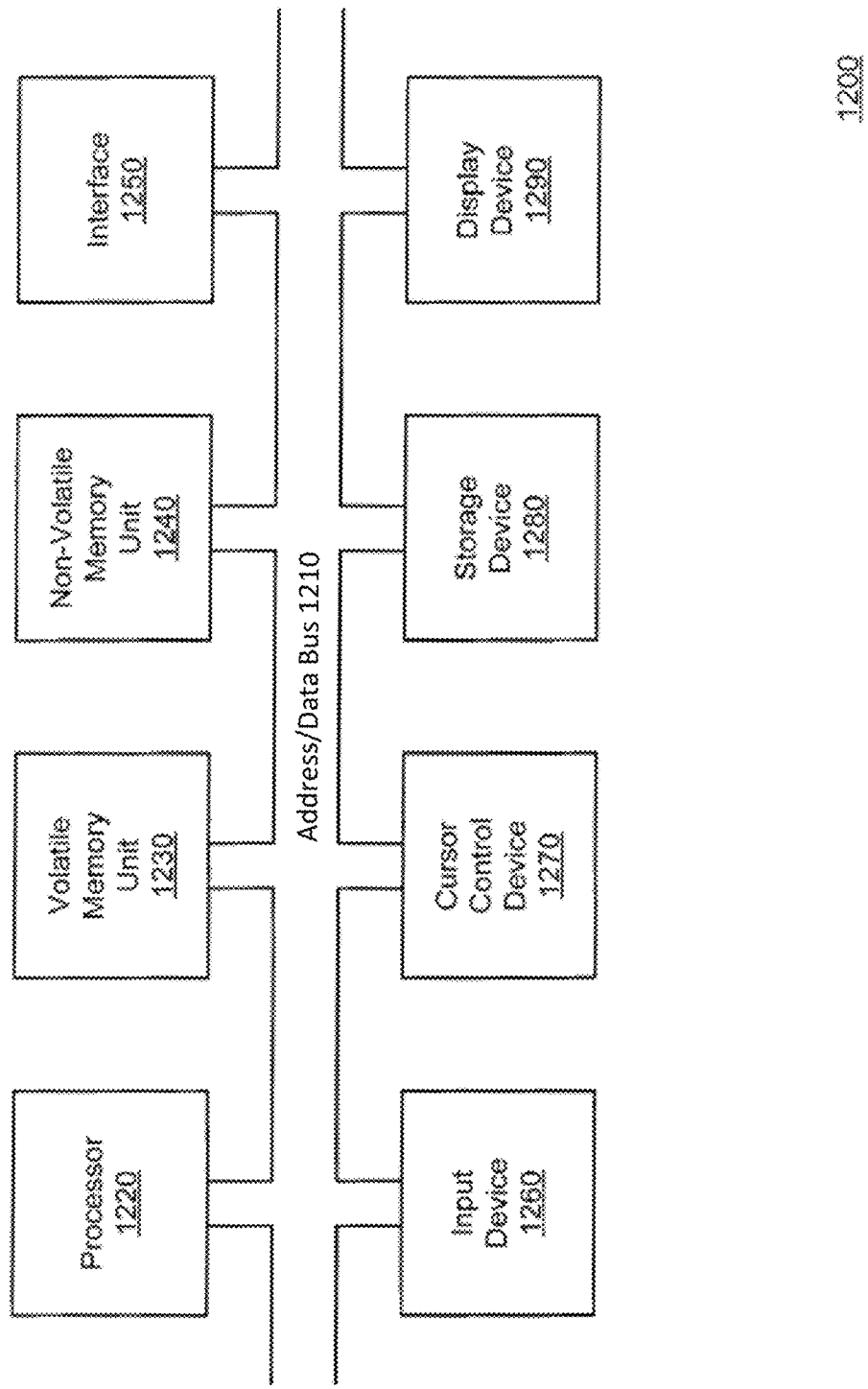
FIG. 9 is a block diagram of a computer system that may be used in conjunction with embodiments of the present invention.

An exemplary computer system 1200 in accordance with an embodiment is shown in FIG. 9. Exemplary computer system 1200 is configured to perform calculations, processes, operations, and/or functions associated with a program or algorithm. In one embodiment, certain processes and steps discussed herein are realized as a series of instructions (e.g., software program) that reside within computer readable memory units and are executed by one or more processors of exemplary computer system 1200. When executed, the instructions cause exemplary computer system 1200 to perform specific actions and exhibit specific behavior, such as described herein.

Exemplary computer system 1200 may include an address/data bus 1210 that is configured to communicate information. Additionally, one or more data processing unit, such as processor 1220, are coupled with address/data bus 1210. Processor 1220 is configured to process information and instructions. In an embodiment, processor 1220 is a microprocessor. Alternatively, processor 1220 may be a different type of processor such as a parallel processor, or a field programmable gate array.

Exemplary computer system 1200 is configured to utilize one or more data storage units. Exemplary computer system 1200 may include a volatile memory unit 1230 (e.g., random access memory ("RAM"), static RAM, dynamic RAM, etc.) coupled with address/data bus 1210, wherein volatile memory unit 1230 is configured to store information and instructions for processor 1220. Exemplary computer system 1200 further may include a non-volatile memory unit 1240 (e.g., read-only memory ("ROM"), programmable ROM ("PROM"), erasable programmable ROM ("EPROM"), electrically erasable programmable ROM "EEPROM"), flash memory, etc.) coupled with address/data bus 1210, wherein non-volatile memory unit 1240 is configured to store static information and instructions for processor 1220. Alternatively exemplary computer system 1200 may execute instructions retrieved from an online data storage unit such as in "Cloud" computing. In an embodiment, exemplary computer system 1200 also may include one or more interfaces, such as interface 1250, coupled with address/data bus 1210. The one or more interfaces are configured to enable exemplary computer system 1200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one embodiment, exemplar computer system 1200 may include an input device 1260 coupled with address/data bus 1210, wherein input device 1260 is configured to communicate information and command selections to processor 1220. In accordance with one embodiment, input device 1260 is an alphanumeric input device, such as a keyboard, that may include alphanumeric and/or function keys. Alternatively, input device 1260 may be an input device other than an alphanumeric input device. In an embodiment, exemplar computer system 1200 may include a cursor control device 1270 coupled with address/data bus 1210, wherein cursor control device 1270 is configured to communicate user input information and/or command selections to processor 1220. In an embodiment, cursor control device 1270 is implemented utilizing a device such as a mouse, a track-ball, a track-pad, an optical tracking device, or a touch screen. The foregoing notwithstanding, in an embodiment, cursor control device 1270 is directed and/or activated via input from input device 1260, such as in response to the use of special keys and key sequence commands associated with input device 1260. In an alternative embodiment, cursor control device 1270 is configured to be directed or guided by voice commands.

In an embodiment, exemplary computer system 1200 further may include one or more optional computer usable data storage devices, such as storage device 1280, coupled with address/data bus 1210. Storage device 1280 is configured to store information and/or computer executable instructions. In one embodiment, storage device 1280 is a storage device such as a magnetic or optical disk drive (e.g., hard disk drive ("HDD"), floppy diskette, compact disk read only memory ("CD-ROM"), digital versatile disk ("DVD")). Pursuant to one embodiment, a display device 1290 is coupled with address/data bus 1210, wherein display device 1290 is configured to display video and/or graphics. In an embodiment, display device 1290 may include a cathode ray tube ("CRT"), liquid crystal display ("LCD"), field emission display ("FED"), plasma display or any other display device suitable for displaying video and/or graphic images and alphanumeric characters recognizable to a user.

Exemplary computer system 1200 is presented herein as an exemplary computing environment in accordance with an embodiment. However, exemplary computer system 1200 is not strictly limited to being a computer system. For example, an embodiment provides that exemplary computer system 1200 represents a type of data processing analysis that may be used in accordance with various embodiments described herein. Moreover, other computing systems may also be implemented. Indeed, the spirit and scope of the present technology is not limited to any single data processing environment. Thus, in an embodiment, one or more operations of various embodiments of the present technology are controlled or implemented utilizing computer-executable instructions, such as program modules, being executed by a computer. In one exemplary implementation, such program modules include routines, programs, objects, components and/or data structures that are configured to perform particular tasks or implement particular abstract data types. In addition, an embodiment provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for identifying a target in a synthetic aperture radar signal, the method comprising:
   receiving phase history data of the synthetic aperture radar signal;
   extracting a plurality of features from the phase history data;
   encoding, by a spiking neural network, the features as a plurality of spiking signals;
   computing, by a readout neural layer, a signal identifier based on the spiking signals in accordance with a mapping weight matrix, the readout neural layer being configured using a supervised learning rule; and
   outputting the signal identifier from the readout neural layer.

2. The method of claim 1, wherein the plurality of features comprise an amplitude of the synthetic aperture radar signal.

3. The method of claim 1, wherein the plurality of features comprise an off-amplitude of the synthetic aperture radar signal.

4. The method of claim 1, wherein the plurality of features comprise a positive phase of the synthetic aperture radar signal.

5. The method of claim 1, wherein the plurality of features comprise a negative phase of the synthetic aperture radar signal.

6. The method of claim 1, wherein the readout neural layer comprises a linear classifier.

7. The method of claim 1, wherein the spiking neural network and the readout neural layer are implemented by a neuromorphic chip.

8. The method of claim 1, further comprising computing average spiking rates from the spiking signals,
   wherein the computing the signal identifier is computed based on the average spiking rates.

9. The method of claim 1, wherein the spiking neural network comprises:
   an input layer configured to receive the features;
   an excitatory neuron layer; and
   an inhibitory neuron layer,
   the input layer being configured to supply spiking signals to the excitatory neuron layer and the inhibitory neuron layer, the inhibitory neuron layer being configured to supply spiking signals to the inhibitory neuron layer and the excitatory neuron layer, the excitatory neuron layer being configured to supply spiking signals to the inhibitory neuron layer and the excitatory neuron layer, and the excitatory neuron layer comprising output neurons configured to output the spiking signals to the readout neural layer.

10. A system configured to identify a target in a synthetic aperture radar signal, the system comprising:

a feature extractor configured to receive phase history data of the synthetic aperture radar signal and to extract a plurality of features from the phase history data;

a spiking neural network configured to encode the features as a plurality of spiking signals;

a readout neural layer configured, using a supervised learning rule, to compute a signal identifier based on the spiking signals in accordance with a mapping weight matrix; and an output configured to output the signal identifier.

11. The system of claim 10, wherein the plurality of features comprise an amplitude of the synthetic aperture radar signal.

12. The system of claim 10, wherein the plurality of features comprise an off-amplitude of the synthetic aperture radar signal.

13. The system of claim 10, wherein the plurality of features comprise a positive phase of the synthetic aperture radar signal.

14. The system of claim 10, wherein the plurality of features comprise a negative phase of the synthetic aperture radar signal.

15. The system of claim 10, wherein the readout neural layer comprises a linear classifier.

16. The system of claim 10, wherein the spiking neural network and the readout neural layer are implemented by a neuromorphic chip.

17. The system of claim 10, wherein the readout neural layer is configured to compute average spiking rates from the spiking signals, and wherein the readout neural layer is configured to compute the signal identifier based on the average spiking rates.

18. The system of claim 10, wherein the spiking neural network comprises:

an input layer configured to receive the features;

an excitatory neuron layer; and an inhibitory neuron layer, the input layer being configured to supply spiking signals to the excitatory neuron layer and the inhibitory neuron layer, the inhibitory neuron layer being configured to supply spiking signals to the inhibitory neuron layer and the excitatory neuron layer, the excitatory neuron layer being configured to supply spiking signals to the inhibitory neuron layer and the excitatory neuron layer, and the excitatory neuron layer comprising output neurons configured to output the spiking signals to the readout neural layer.

19. A method for training a system for identifying a target in a synthetic aperture radar signal, the system comprising a feature extractor, a spiking neural network, and a readout neural layer, the method comprising:

extracting, by a feature extractor, a plurality of features from phase history data from a plurality of labeled synthetic aperture radar training signals;

encoding, by a spiking neural network, the features as a plurality of spiking signals; and training a readout neural layer and a mapping weight matrix to compute a signal identifier based on the plurality of spiking signals and the labeled synthetic aperture radar training signals using a supervised learning rule.

20. The method of claim 19, wherein the spiking neural network and the readout neural layer are implemented by a neuromorphic chip.

21. The method of claim 19, wherein the plurality of features comprise an amplitude and an off-amplitude of the synthetic aperture radar signal.

22. The method of claim 19, wherein the plurality of features comprise a positive phase and a negative phase of the synthetic aperture radar signal.

23. The method of claim 19, wherein the spiking neural network is configured in accordance with a plurality of parameters, the parameters being computed in accordance with a parameter search process and based on the labeled synthetic aperture radar training signals.

24. The method of claim 23, wherein the parameter search process comprises:

initializing a set of parameters;

computing a set of features based on the labeled synthetic aperture radar training signals;

configuring the spiking neural network based on the set of parameters;

generating, by the spiking neural network, a plurality of spiking sequences from the set of features;

training a readout layer based on the spiking sequences and a plurality of labels of the labeled synthetic aperture radar training signals;

computing a classification rate;

determining that the classification rate fails to exceed a threshold; and updating the parameters based on the classification rate.

25. A method for training a system for identifying a target in a synthetic aperture radar signal, the system comprising a feature extractor, a spiking neural network, and a readout neural layer, the method comprising:

extracting, by a feature extractor, a plurality of features from a plurality of labeled synthetic aperture radar training signals without synthesizing an image from the synthetic aperture radar signal;

encoding, by a spiking neural network, the features as a plurality of spiking signals, the spiking neural network being configured using parameter search; and training a readout neural layer and a mapping weight matrix to compute a signal identifier based on the plurality of spiking signals and the labeled synthetic aperture radar training signals using a supervised learning rule, wherein the readout neural layer comprises a linear classifier, the linear classifier comprising a plurality of classifier weights, and wherein the training the readout neural layer comprises applying a rank-1 learning rule to compute the classifier weights.

* * * * *